United States Patent [19]

Sim

[11] Patent Number: 5,177,383
[45] Date of Patent: Jan. 5, 1993

[54] VOICE COIL MOTOR
[75] Inventor: Jun-seok Sim, Seoul, Rep. of Korea
[73] Assignee: Samsung Electro-Mechanics Co., Ltd., Kyunggi, Rep. of Korea
[21] Appl. No.: 814,784
[22] Filed: Dec. 31, 1991
[30] Foreign Application Priority Data
Feb. 28, 1991 [KR] Rep. of Korea .................... 91-3360
[51] Int. Cl.⁵ ............................................ H02K 41/00
[52] U.S. Cl. ...................................... 310/13; 310/12; 360/78.13
[58] Field of Search ............................. 310/12, 13, 14; 360/78.01, 78.04, 78.12, 78.13

[56] References Cited
U.S. PATENT DOCUMENTS
5,051,669  9/1991  Hsiao et al. .................... 318/119

OTHER PUBLICATIONS
"IEEE Transactions on Magnetics"; vol. 25, No. 4; pp. 3073-3075; Jul., 1989.

Primary Examiner—Steven L. Stephan
Assistant Examiner—Judson H. Jones
Attorney, Agent, or Firm—Leydig, Voit & Mayer

[57] ABSTRACT

A voice coil motor is disclosed which conveys a head of optical or magneto-optical disk drive or magnetic disk drive as a kind of a linear motor. The motor comprises a yoke member composed of a central portion, upper/lower fringes and left/right fringes forming magnetic paths, permanent magnets being adhered on the upper/lower fringes of the yoke member and each having an air gap with respect to the central portion. A moving coil is wound slidably around the central portion of the yoke member, and a shorted turn offsets the magnetic flux due to the current flowing in the moving coil, wherein the shorted turn has a plurality of fins on its conductive sleeve-shaped body and is disposed primarily in the yoke member except the section where the moving coil moves. The motor demonstrates an excellent control function while generating a maximum amount of thrust.

8 Claims, 4 Drawing Sheets

VOICE COIL MOTOR

BACKGROUND OF THE INVENTION

The present invention relates to a voice coil motor which is classified as a kind of a linear motor for conveying a head of an optical (or magneto-optical) disk drive or a magnetic disk drive, etc., and more particularly to a voice coil motor incorporating a shorted turn for causing the motor's control function to become uniform.

An optical head of an optical (or magneto-optical) disk drive or a magnetic head of magnetic disk drive is installed to move in the direction of the disk's diameter to seek information recorded in the disk. To make the head trace a desired track quickly and precisely, a motor having a quick response and constant control function is required.

FIGS. 1, 2 and 3 illustrate simple and typical voice coil motors for use in conveying a head. The voice coil motor comprises a yoke member 10 forming magnetic paths, permanent magnets 20 and 20' mounted on the respective upper and lower portions 12 and 12' of the yoke member 10, maintaining air gaps G on both sides of central portion 11 of the yoke member, and a moving coil 30 wound slidably around the central portion 11 of yoke member 10. When current flows through moving coil 30, electromagnetic thrust works in a direction perpendicular to those of the current and the magnetic flux of permanent magnets 20 and 20'. Moving coil 30 moves along central portion 11 of yoke member 10 due to the thrust. The magnetic flux paths by permanent magnets 20 and 20' are shown in FIG. 2, and the magnetic flux paths by moving coil 30 are shown in FIG. 3. In other words, magnetic flux $fm_1$ and $fm_2$ generated from permanent magnet 20 or magnetic flux $fm_3$ and $fm_4$ generated from permanent magnet 20' are horizontally separated into left and right fields and flow in opposing directions within yoke member 10. Magnetic flux $fc_1$ and $fc_2$ generated by current flowing through moving coil 30 are vertically divided into upper and lower fields and each flux flows in a certain direction according to the direction of its current. Magnetic flux $fm_1$ to $fm_4$ of the permanent magnets constantly flow but magnetic flux $fc_1$ and $fc_2$ of moving coil 30 have varied strength and direction according to current. Thus, the density of the whole magnetic flux distributed within the yoke member varies by the movement of the moving coil. This brings out the variation of density of air gap's magnetic flux distributed in air gaps G between the central portion 11 of the yoke member 10 and each of the permanent magnets 20 and 20', in effect causing a problem by deteriorating the control function.

FIG. 4 illustrates a voice coil motor having a conventional shorted turn to solve the above problem. Referring to FIG. 4, the voice coil motor comprises shorted turn 40 made by coating a conductive plate having a certain thickness in central portion 11 of yoke member 10 in order to reduce the influence of the magnetic flux of the moving coil on the magnetic flux of the permanent magnet. That is, when the magnetic flux of moving coil 30 is varied, short circuit current is induced to the shorted turn and the magnetic flux of the moving coil is offset due to a secondary magnetic flux formed by the short circuit current. The technology of the shorted turn is described in detail in IEEE Transactions Mag., Vol. 25, No. 4, 1989, pages 3073 to 3075.

Due to the operation of the shorted turn, such voice coil motor of the above-mentioned structure has less variation of the magnetic flux of the permanent magnet distributed in the yoke member and also constant density of air gap's magnetic flux distributed in the air gap between the permanent magnet and the central portion of the yoke member. However, since the shorted turn exists within the air gap, the air gap should be widened as much as the thickness of the shorted turn. This decreases the density of the air gap's magnetic flux. Accordingly, the voice coil motor having a shorted turn in the central portion of the yoke member has a weak thrust. To solve the problem, a permanent magnet of high efficiency must be used or the current of the moving coil must be increased, which, however, is undesirable because of the rise in the product's cost and its limit.

SUMMARY OF THE INVENTION

Therefore, it is an object of the present invention to provide a voice coil motor having constant density of air gap's magnetic flux due to an improved shorted turn.

To accomplish the object of the present invention, there is provided a voice coil motor comprising a yoke member composed of a central portion, upper/lower fringes and left/right fringes forming magnetic path, permanent magnets being adhered on the upper/lower fringes of the yoke member and each having an air gap in either side of the central portion, a moving coil wound slidably around the central portion of the yoke member, and a shorted turn offsetting the magnetic flux due to the current flowing in the moving coil, wherein the shorted turn has a plurality of fins on its conductive sleeve-shaped body and is disposed in the yoke member except the section where the moving coil moves.

BRIEF DESCRIPTION OF THE DRAWINGS

The above object and other advantages of the present invention will become more apparent by describing in detail a preferred embodiment of the present invention with reference to the attached drawings in which.

DETAILED DESCRIPTION OF THE INVENTION

Figure 1:
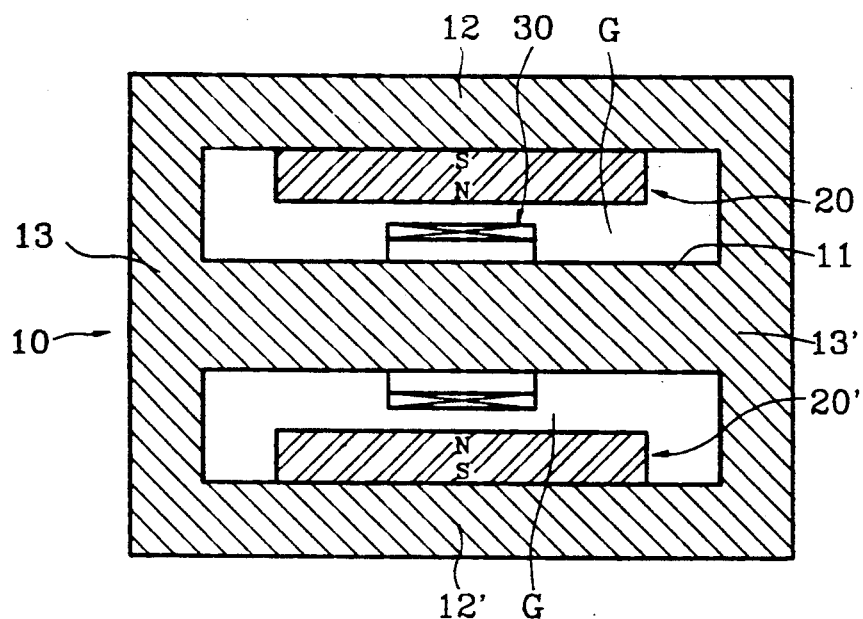
FIG. 1 illustrates the structure of a conventional voice coil motor.
Figure 2:
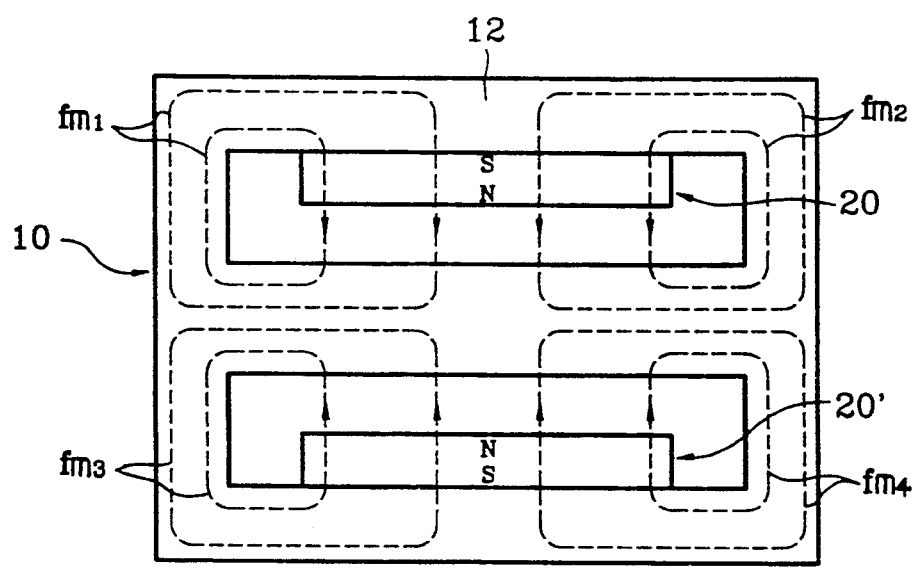
FIG. 2 illustrates magnetic flux paths by a permanent magnet in the voice coil motor of FIG. 1.

In the following description of the drawings, like elements are numbered with like reference numerals.

Figure 5:
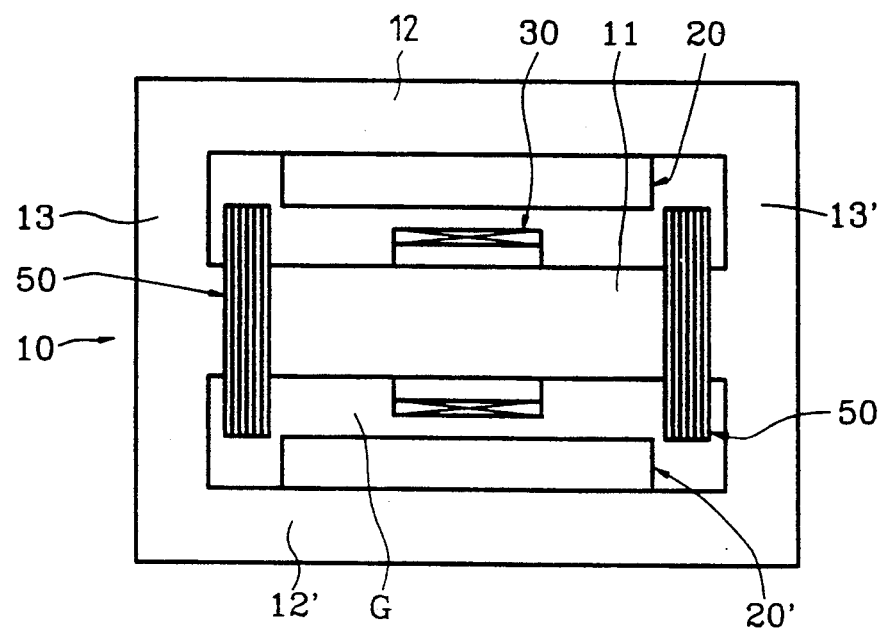
FIG. 5 illustrates the structure of a voice coil motor having a fin-type shorted turn according to the present invention.
Figure 6:
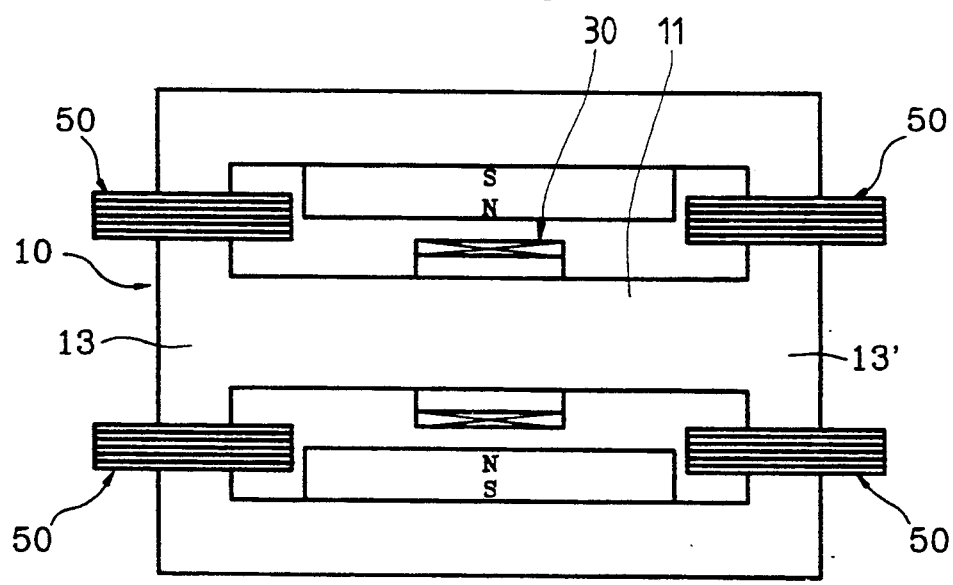
FIG. 6 illustrates the structure of a voice coil motor having a fin-type shorted turn according to another embodiment of the present invention.
Figure 7:
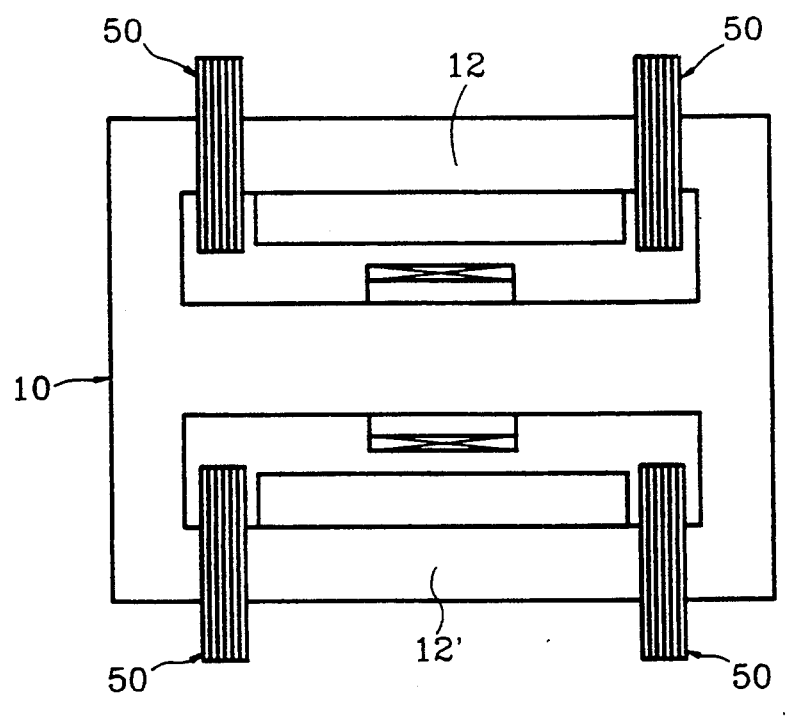
FIG. 7 illustrates the structure of a voice coil motor having a fin-type shorted turn according to still another embodiment of the present invention.

FIGS. 5 to 7 each illustrates a voice coil motor having an improved shorted turn according to the present invention. In the drawings, reference numeral 10 represents a yoke member, 20 and 20' represent permanent magnets, 30 represents a moving coil, and 50 represents an improved shorted turn of the present invention. Yoke member 10 forms magnetic paths with central portion 11, upper/lower fringes 12 and 12' and left/right fringes 13 and 13'. Permanent magnets 20 and 20' adhered on upper/lower fringes 12 and 12' of yoke member 10 are disposed such that like magnetic poles oppose each other. Magnetic flux generated from permanent magnets 20 and 20' starts from one magnetic pole of each permanent magnet and reaches the other magnetic pole via central portion 11, left/right fringes 13 and 13' and upper/lower fringes 12 and 12' of yoke member 10. Here, since the magnetic flux is distributed in air gap G formed between each of permanent magnets 20 and 20' and central portion 11 of yoke member 10, the magnetic flux interlinks part of moving coil 30 positioned in the air gap. Moving coil 30 is wound in the bobbinless form and moves along central portion 11 of yoke member 10. The moving coil is connected to an unshown carrier (for example, optical head or magnetic head) and is supplied with current from an external power source. In FIG. 5, two shorted turns 50 are installed on the left and right ends of central portion 11 of yoke member 10. In FIG. 6, four shorted turns 50 are installed on the upper and lower ends of left/right fringes 13 and 13' of yoke member 10, and in FIG. 7, four shorted turns 50 are installed on the left and right ends of upper/lower fringes 12 and 12' of yoke member 10 In FIG. 5, considering that central portion 11 of yoke member 10 is longer than the length of effective magnetic pole face of permanent magnets 20 and 20' and moving stroke of moving coil 30 is set to be shorter than the length of effective magnetic pole face of permanent magnets 20 and 20' the left and right ends of central portion 11 which are out of the range of the moving stroke are selected as the location for shorted turns 50.

Figure 8:
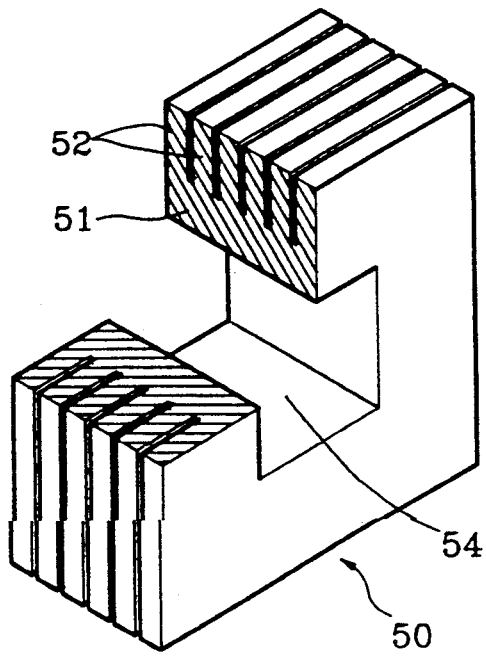
FIG. 8 is a cutaway perspective view illustrating the structure of the fin-type shorted turn shown in FIGS. 5, 6, and 7.
Figure 9:
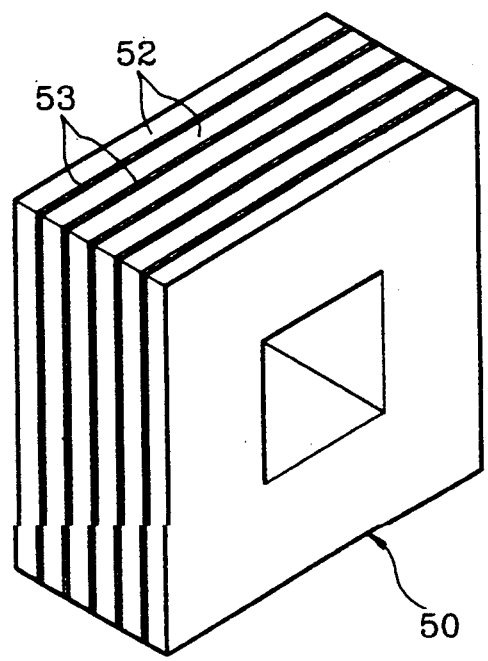
FIG. 9 is a perspective view illustrating the structure wherein insulating material is filled between fins of the shorted turn shown in FIG. 8.

As shown in FIG. 8, the shorted turn 50 is constructed in such a manner that a plurality of fins 52 are formed on a sleeve-shaped body 51 having a central hollow 54 in which yoke member 10 is inserted. As shown in FIG. 9, the shorted turn 50 may be also constructed in such a manner that insulating material 53 is filled between a plurality of fins 52 so as to enhance the mechanical strength of fins 52.

Figure 3:
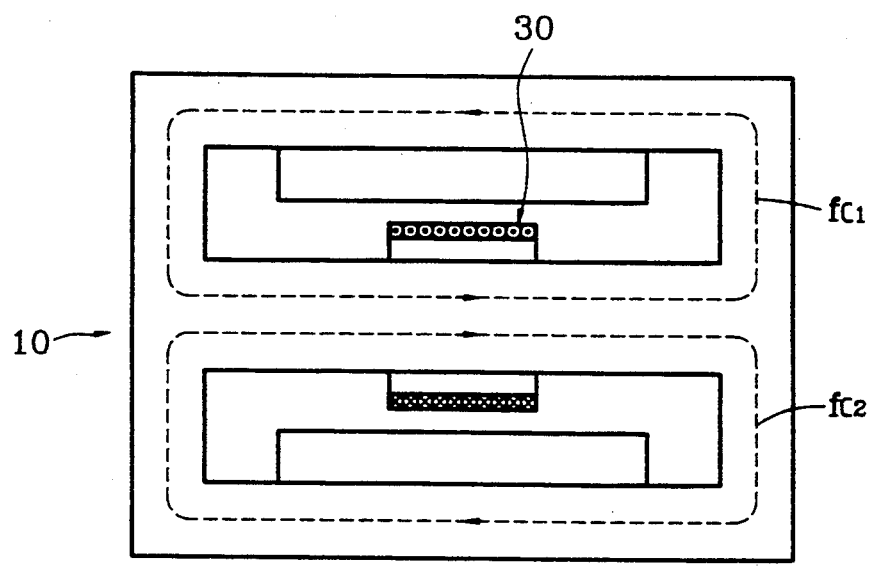
FIG. 3 illustrates magnetic flux paths by current flowing the moving coil in the voice coil motor of FIG. 1.
Figure 4:
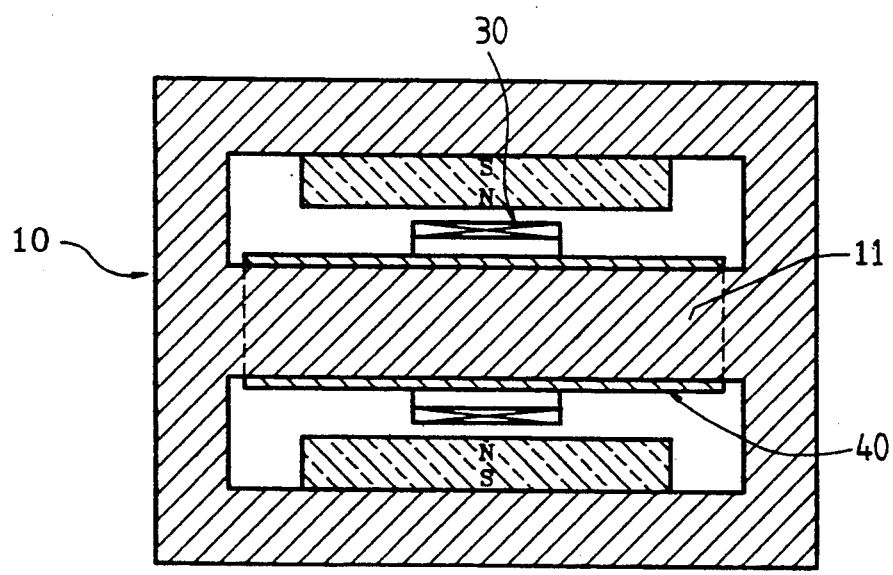
FIG. 4 illustrates the structure of a voice coil motor having a conventional shorted turn.

According to the voice coil motor of the present invention, when current is applied to moving coil from an external power source, as shown in FIG. 3, the magnetic flux generated by the current flows through respective portions of yoke member 10 and air gap G. When the magnetic flux is varied, short circuit current in the direction of offsetting the magnetic flux is induced to respective fins 52 of shorted turn 50. The magnetic flux of moving coil 30 is offset by secondary magnetic flux formed by the short circuit current induced to fins 52. Thus, the whole magnetic flux distributed in each portion of yoke member 10 hardly varies and the constant density of air gap's magnetic flux distributed through air gap G is obtained.

As described in detail above, since the improved shorted turn in the present invention is installed in the portion except the central portion of the yoke member where the moving coil occupies to move, the air gap does not need to be widened, thereby maintaining the maximum magnetic flux density of the air gap. Accordingly, the present invention provides a voice coil motor having an excellent control function and maximum thrust. Further, in order to reduce the electrical resistance against the short circuit current induced to the fins of the shorted turn, the number of fins and their sectional area can be appropriately selected, resulting in higher reliability by means of precise design.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A voice coil motor comprising:
    a yoke member composed of a central portion, upper/lower fringes and left/right fringes forming magnetic paths;
    permanent magnets being adhered on the respective upper/lower fringes of said yoke member and each having a predetermined air gap with respect to the central portion;
    a moving coil would slidably around the central portion of said yoke member having a predetermined range of motion; and
    a shorted turn offsetting the magnetic flux due to the current flowing in said moving coil, wherein said shorted turn includes a plurality of fins on a conductive sleeve-shaped body and is disposed on said yoke member at a position that is outside of the predetermined range of motion of said moving coil.

2. The voice coil motor as claimed in claim 1, wherein insulating material is filled between said plurality of fins of said shorted turn.

3. The voice coil motor as claimed in claim 1, wherein shorted turns are installed on the left and right ends of the central portion of said yoke member respectively.

4. The voice coil motor as claimed in claim 2, wherein shorted turns are installed on the left and right ends of the central portion of said yoke member respectively.

5. The voice coil motor as claimed in claim 1, wherein shorted turns are installed on the upper and lower ends of the left/right fringes of said yoke member respectively.

6. The voice coil motor as claimed in claim 2, wherein shorted turns are installed on the upper and lower ends, of the left/right fringes of said yoke member respectively.

7. The voice coil motor as claimed in claim 1, wherein shorted turns are installed on the left and right ends, of the upper/lower fringes of said yoke member respectively.

8. The voice coil motor as claimed in claim 2, wherein shorted turns are installed on the left and right ends of the upper/lower fringes of said yoke member respectively.

* * * * *

UNITED STATES PATENT AND TRADEMARK OFFICE
CERTIFICATE OF CORRECTION

PATENT NO. : 5,177,383
DATED      : January 5, 1993
INVENTOR(S) : Jun-seok Sim

It is certified that error appears in the above-identified patent and that said Letters Patent is hereby corrected as shown below:

Claim 1, col. 4, line 31, change "would" to --wound--.

Claim 6, col. 4, line 57, delete ",".

Claim 7, col. 4, line 61, delete ",".

Signed and Sealed this

Nineteenth Day of October, 1993

Attest:

BRUCE LEHMAN

*Attesting Officer*   *Commissioner of Patents and Trademarks*